United States Patent
Palviainen et al.

(10) Patent No.: US 6,385,446 B2
(45) Date of Patent: May 7, 2002

(54) CALL FORWARDING IN A TELECOMMUNICATIONS NETWORK

(75) Inventors: Keijo Palviainen, Helsinki; Matti Keskinen, Jarvenpaa; Erkki Ojala, Veikkola; Petteri Yla-Outinen, Ojakkala, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/794,424

(22) Filed: Feb. 27, 2001

Related U.S. Application Data

(63) Continuation of application No. PCT/FI99/00735, filed on Sep. 10, 1999.

(30) Foreign Application Priority Data

Sep. 29, 1998 (FI) .................................................. 982093

(51) Int. Cl.[7] .................................................. H04Q 7/38
(52) U.S. Cl. ........................ 455/417; 455/414; 455/527; 455/565; 379/211.02
(58) Field of Search ................................. 455/417, 414, 455/565, 527, 413, 410, 445; 379/208, 210–212

(56) References Cited

U.S. PATENT DOCUMENTS 3,626,109 A * 12/1971 Bartlett et al. .............. 455/417
5,790,638 A    8/1998 Bertacchi ...................... 379/89
5,884,193 A * 3/1999 Kaplan ........................ 455/565
5,937,052 A * 8/1999 Cook-Hellberg ............ 379/219

FOREIGN PATENT DOCUMENTS

| WO | WO 94/21075 | 9/1994 |
|----|-------------|--------|
| WO | WO 97/47152 | 12/1997 |
| WO | WO 98/05153 | 2/1998 |
| WO | WO 98/27781 | 6/1998 |

OTHER PUBLICATIONS

Michel Mouly and Marie–Bernadette Pautet, "The GSM System for Mobile Communications", Palaiseau, France, ISBN:2–9507190–0–7.

International Search Report for PCT/FI99/00735.

* cited by examiner

*Primary Examiner*—Vivian Chin
*Assistant Examiner*—Duc Nguyen
(74) *Attorney, Agent, or Firm*—Altera Law Group, LLC

(57) ABSTRACT

In telecommunications networks the problem with call forwarding restriction according to prior art is that access through call forwarding to numbers with ensuring an answer rather than possible further forwarding is not possible. The invention is based on the idea that call forwarding is allowed despite call forwarding restriction when the number to be used in forwarding the call meets special conditions set beforehand. The number is thus compared with the preset conditions and depending on the result of this comparison the call is either forwarded or not.

9 Claims, 4 Drawing Sheets

CALL FORWARDING IN A TELECOMMUNICATIONS NETWORK

This application is a continuation of PCT/FI99/00735 filed Sep. 10, 1999.

FIELD OF THE INVENTION

The invention relates to call forwarding functionality.

BACKGROUND OF THE INVENTION

In telecommunications networks call forwarding functionality forwards a call to a predetermined number in case of a busy line, no reply, or unconditional call forwarding, for example. In order to avoid infinite loops in call forwarding and consequent overloading of the network, the number of successive times a call can be forwarded is usually limited. In some countries or networks, call forwarding is allowed only once per call. In this case, information is transferred as an attachment to the signaling, which indicates whether the call has been forwarded or not. When a forwarded call is indicated, re-forwarding of the call is prohibited. Hence, two subscribers B and C who have designated call forwarding to each other would not cause a call made by subscriber A to subscriber B to be forwarded back and forth between the numbers of B and C. In another solution, call forwarding restriction is implemented with the aid of a call forwarding counter CFC, which is transferred between switching centers. CFC indicates the number of times call forwarding has already been executed for the call. A maximum number set for the CFC restricts the number of times a call can be forwarded, e.g. five successive times for call forwarding per one call. Usually the maximum number is some value from 1 to 5.

FIG. 1 of the attached drawing shows a simplified block diagram of a GSM mobile communications system (Global System for Mobile communications). The mobile station MS is connected via a radio path to a base transceiver station BTS, in FIG. 1 to the base station BTS1. A base station sub-system BSS consists of a base station controller BSC and the base stations BTS controlled by it. A mobile services switching center MSC usually controls several base station controllers BSC and is connected to other mobile services switching centers and a GMSC (Gateway Mobile services Switching Center). Via the GMSC, the GSM network is connected to other networks, such as the PSTN (Public Service Telephone Network), another mobile communication network PLMN, or the ISDN network. Subscriber information is stored permanently in the home location register HLR and temporarily in the visited location register VLR. The operation of the entire GSM system is monitored by the operation and maintenance center OMC.

FIG. 2 of the attached drawing shows call routing in the GSM network as a signaling diagram. In the following, call forwarding is described with reference to this figure. In the example of FIG. 2, a call is transferred from the network to the gateway mobile services switching center GMSC with the setup-message IAM 20 (Initial Address Message). As an attachment to the IAM-message, the telephone number of the called subscriber and the information about call forwarding or the call forwarding counter CFC are transferred. The GMSC sends a request to the home location register HLR of the called subscriber for routing information in the SRI-message 21 (Send Routing Information). Information about call forwarding set for this called subscriber number is contained in the subscriber information in HLR and/or VLR. Unconditional call forwarding can be performed by the HLR, whereas call forwarding on Busy can only be carried out by the VLR in charge of the subscriber. Conditional call forwarding, such as call forwarding on Not Reachable (CFNRc) and call forwarding on No Reply (CFNRy), can be performed either by the HLR or the VLR.

When the HLR initiates call forwarding, the HLR sends the forwarded-to number to the GMSC in SRI ACK-message 24 (Send Routing Information Acknowledge). After receiving this number to be used in call forwarding, the GMSC examines the information about call forwarding received with the IAM-message. If the information indicates that the call has already been forwarded and the call can be forwarded only once, the call is not forwarded second time. When a call forwarding counter CFC is transferred with the IAM-message, the GMSC compares the value of the CFC to the maximum value set for call forwarding. For example, if the value of CFC is 3 and the maximum value is set at 5, the CFC value is increased by one and the call is forwarded to the number given for forwarding. If the CFC value equals the maximum set value, the call is not forwarded once more. If call forwarding is still allowed, the call is forwarded to the new number, e.g. to another switching center VMSC in IAM-message 25 which contains the information about call forwarding or the new CFC. If call forwarding is restricted, the call is normally released/disconnected. In call forwarding initiated by the HLR, messages 22 and 23 in FIG. 2 are not needed.

When VLR initiates call forwarding, the HLR sends the PRN-message 22 (Provide Routing Number) to the subscriber's current visited location register VLR. The VLR provides the HLR with mobile station routing number MSRN (stage 23), which HLR forwards to GMSC in SRI ACK-message 24 (Send Routing Information Acknowledge). Based on the routing information, the call is routed to the visited mobile services switching center VMSC, where the VLR provides the number to be used in forwarding the call. The switching center examines if call forwarding is still allowed for this call using the information about call forwarding or the call forwarding counter CFC as described above. If call forwarding is still allowed, the call is forwarded to the given number along with the information about call forwarding or the new CFC as described above.

The examination of call forwarding information can just as well be performed by the HLR when the information about call forwarding or the CFC is transferred to the HLR in connection with the routing number request. In that case, the examination is carried out in a manner similar to that described above, usually both in the switching center and in the HLR. As a result call forwarding is either allowed or denied.

FIG. 3 shows a block diagram of the units of the switching center which are essential for call forwarding functionality. FIG. 3 illustrates the use of call forwarding counter CFC for call forwarding restriction. The CF (Call Forwarding) handling unit 31 receives the parameters relating to the forwarding of the call in question and compares the CFC value received to the maximum value retrieved from max_CF storage 33. Call forwarding information of the called subscriber number is retrieved from the subscriber information of HLR via HLR request unit 35 and/or from the VLR 37, which can be located in proximity to the switching center. After comparison of the CFC value, the call is either forwarded, when CFC is below the maximum value set, or disconnected, when CFC is equal to the maximum value. When forwarding the call, the CF handling unit 31 increases the CFC value by one.

The problem with the call forwarding restriction described above is that access through call forwarding to numbers with ensuring an answer rather than possible further forwarding, such as voice mail, is not possible. Therefore, a call made by subscriber A to subscriber B can be forwarded to the mobile phone of subscriber B but cannot then be forwarded further on to the voice mail, if only one call forwarding is allowed.

SUMMARY OF THE INVENTION

The object of this invention is to facilitate call forwarding when call forwarding restriction takes place.

This is achieved by a method and an arrangement according to the invention characterized by what is stated in the independent claims. Special embodiments of the invention are presented in the dependent claims.

The invention is based on the idea that call forwarding is allowed despite call forwarding restriction when the number to be used in forwarding the call meets special conditions set beforehand. The number is thus compared with the preset conditions and depending on the result of this comparison the call is either forwarded or not.

The advantage of call forwarding according to the invention is that call forwarding can be allowed to certain telephone numbers despite any call forwarding restrictions.

Another advantage of the invention is that call forwarding is flexible and conditions for additional call forwarding can be custom-tailored.

BRIEF DESCRIPTION OF THE DRAWINGS

The preferred embodiments of the invention will now be described with reference to the attached drawings, in which.

DETAILED DESCRIPTION OF THE INVENTION

Figure 1:
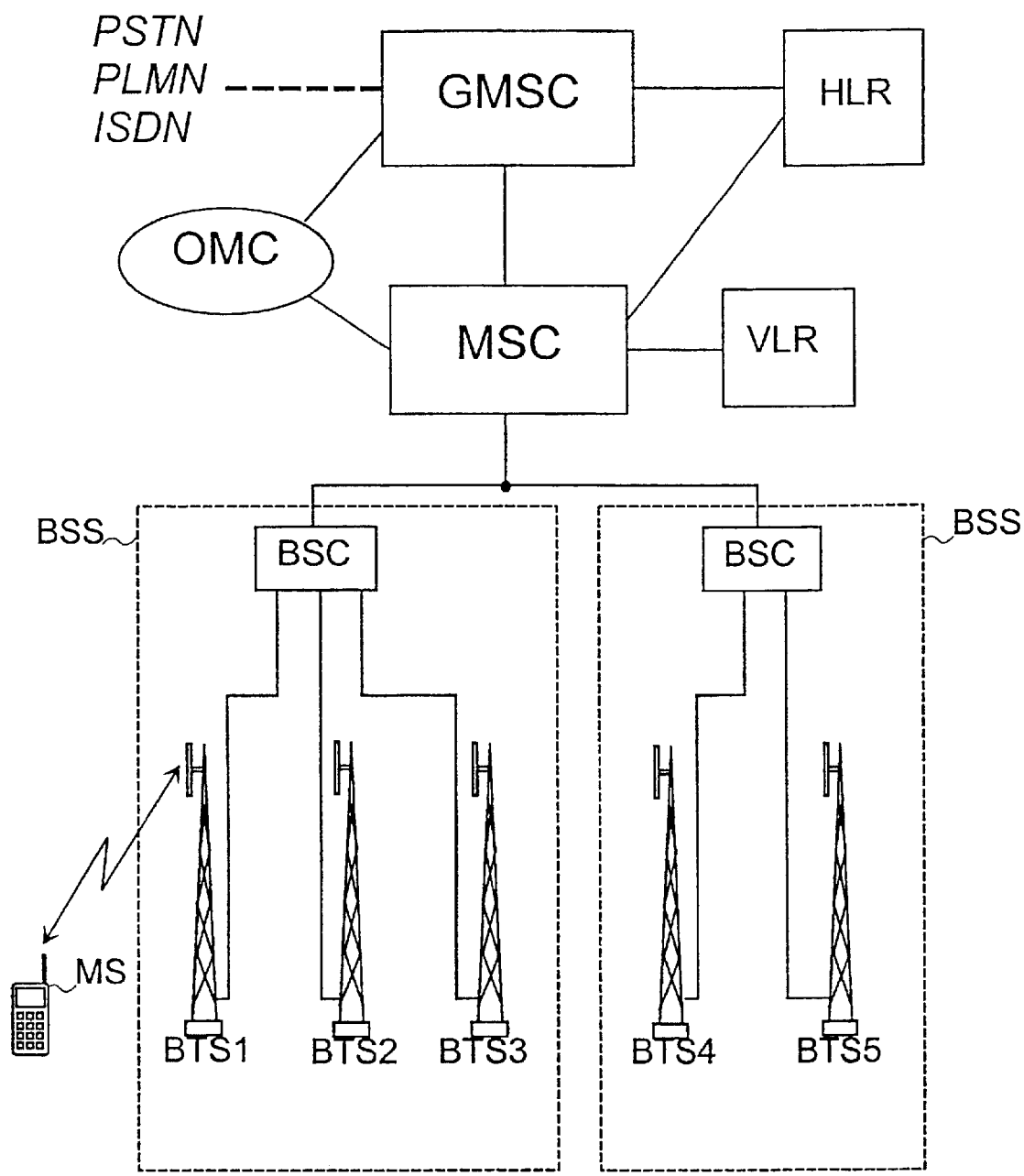
FIG. 1 shows the parts of the mobile communication network that are essential for the invention.
Figure 2:
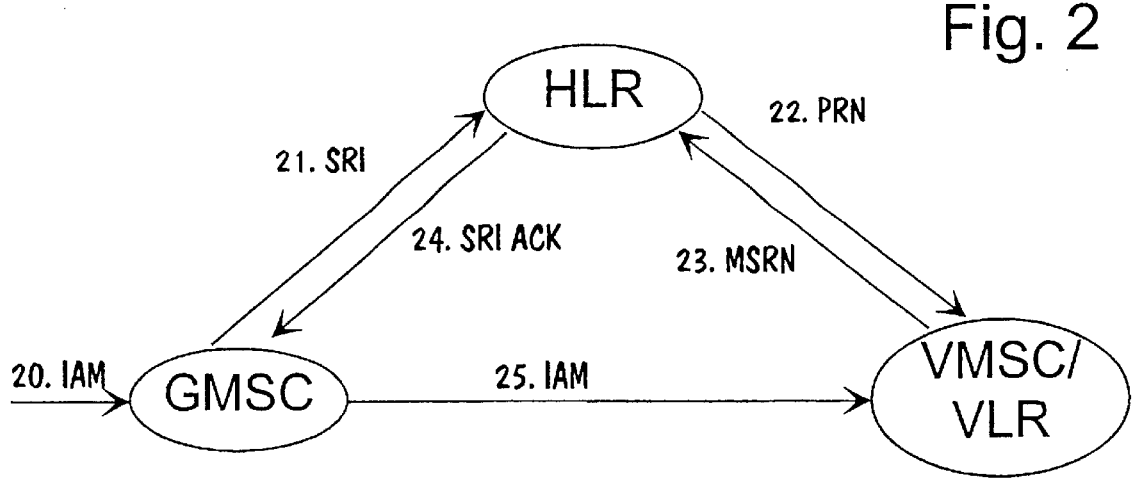
FIG. 2 shows call routing according to prior art in the GSM network.
Figure 3:
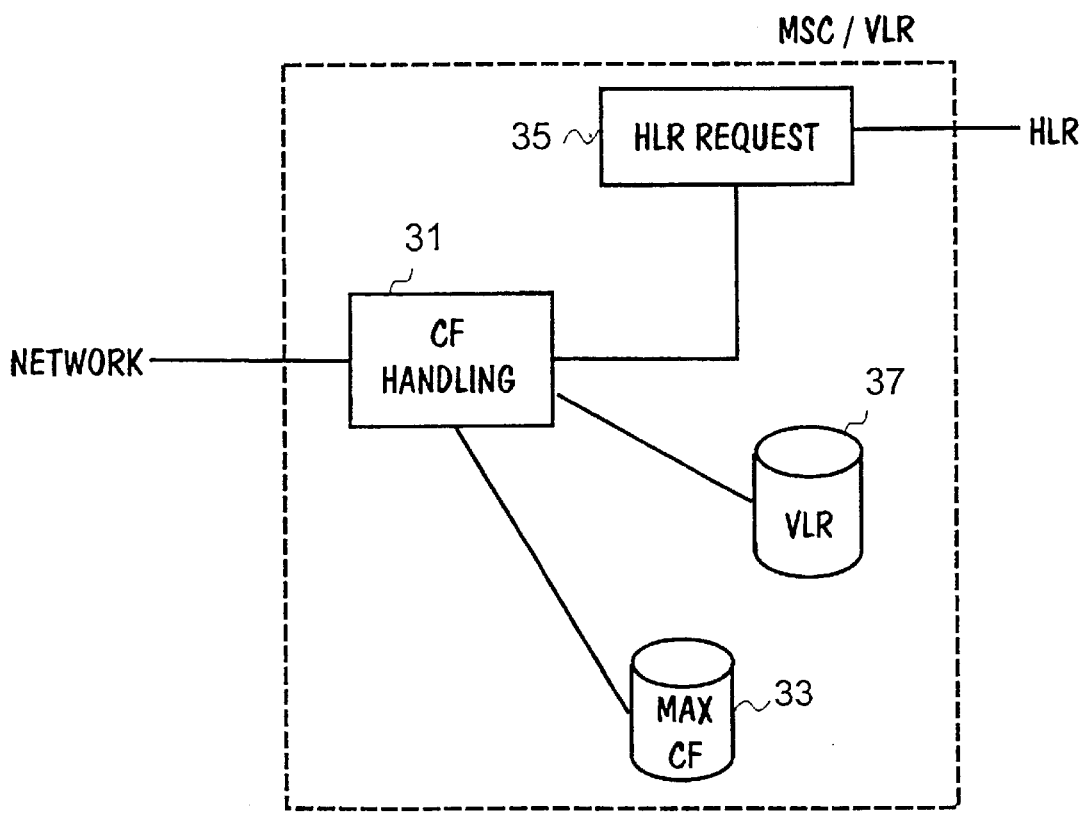
FIG. 3 shows a known block diagram of the units of the switching center which are essential for call forwarding functionality.

The present invention can be applied to any telecommunications network. The invention will be described below in more detail mostly by using the digital mobile communications system GSM as an example. FIG. 1 shows the simplified structure of a GSM network as described earlier. An interested reader can find more background information about GSM system in GSM specifications and the book: "The GSM System for Mobile Communications", M. Mouly & M. Pautet, Palaiseau, France, 1992, ISBN:2-95071900-7.

In the following, the first embodiment of the invention is described in more detail with reference to FIGS. 4, 5, and 6.

Figure 4:
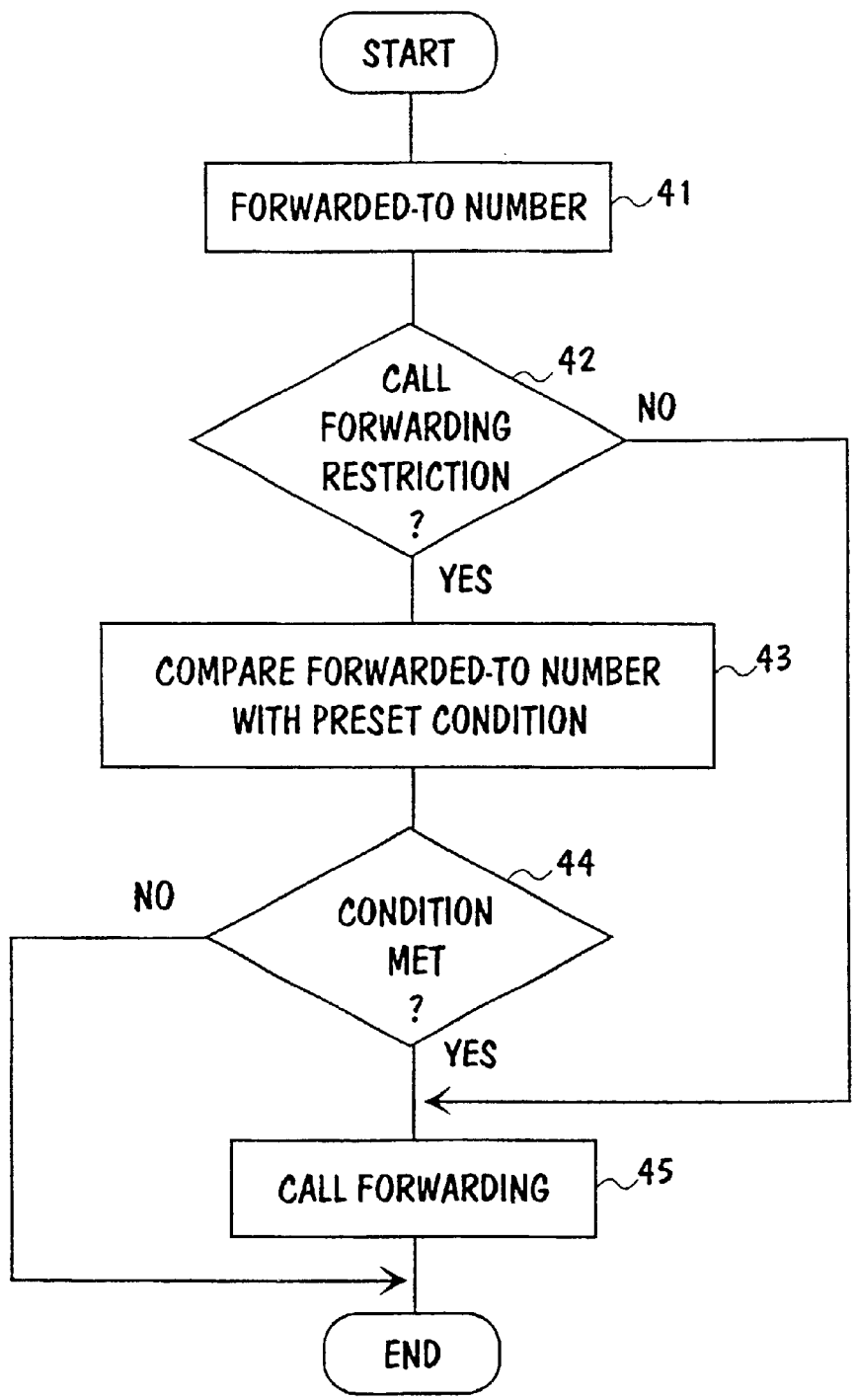
FIG. 4 shows call forwarding according to the invention as a flow chart.

FIG. 4 shows a flow chart of call forwarding according to the invention. At stage 41 a forwarded-to number to be used in forwarding the call is provided to the switching center MSC according to prior art either by the HLR or the VLR. At stage 42 a check is made as to whether call forwarding is allowed according to prior art, based on the information about call forwarding or by comparing the call forwarding counter CFC with a maximum value, for example. If call forwarding is allowed, the call is forwarded according to prior art. If call forwarding is not allowed at stage 42, the forwarded-to number to be used in forwarding the call is compared with a preset condition according to the invention (stage 43). If the preset condition is met at stage 44, call forwarding is allowed at stage 45. If the condition is not met at stage 44, the call forwarding restriction applies and the call is handled in some manner known according to prior art.

The preset condition for call forwarding according to the invention can be that at least one digit in the forwarded-to number has to be equal to a preset value of this digit. For example, the first digits of the number are set to be +358 66 123 to fulfill the condition according to the invention. In that case, number +358 66 123123 would fulfill the condition and call forwarding would be allowed to that number, but number +358 66 321321 would not fulfill the condition and the call would not be forwarded to that number. Especially the condition for call forwarding according to the invention can be preset to allow call forwarding to a voice mail number even when call forwarding restriction according to prior art has taken place, provided that the voice mail numbers are easily distinguished from other telephone numbers, with a certain first digit or digits, for example.

An example situation implementing call forwarding according to the invention would be a call made by subscriber A to subscriber B's fixed network telephone number from where there is unconditional call forwarding to the mobile telephone number of subscriber B. This call forwarding is performed according to prior art. In this example, the maximum number of times for call forwarding per call is set at 1 and the preset condition for call forwarding according to the invention is set to cover voice mail numbers. When subscriber B is not accessible, i.e. does not answer or is busy at this first forwarded-to number, second call forwarding is needed to be performed to the voice mail of subscriber B's mobile subscription. According to the invention the second forwarded-to number, i.e. the number of the voice mail, is compared with the preset condition. As the second number for forwarding fulfills the preset condition and is thus recognized as a voice mail number, the call is forwarded to this voice mail number. In this example, it is safe to forward the call to the voice mail, as there will be no further call forwarding from that second forwarded-to number due to the nature of voice mail service. Therefore, this additional call forwarding according to the invention does not unduly load the network as voice mail only records the voice message of the calling subscriber.

Figure 5:
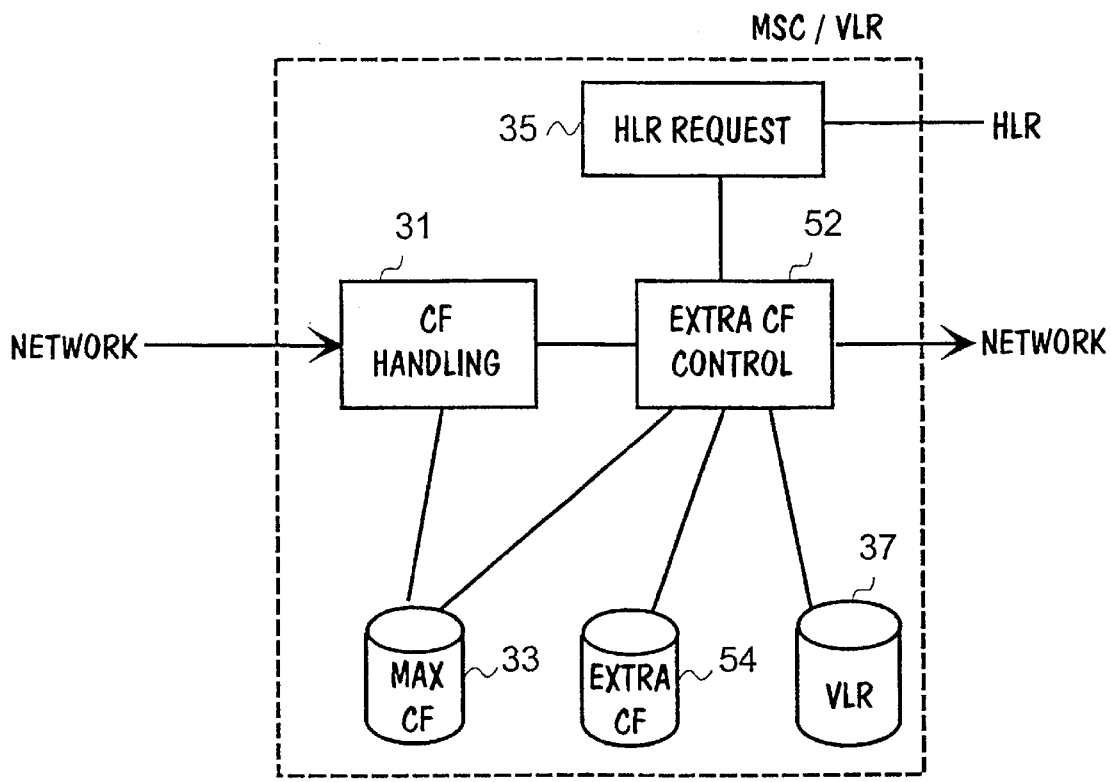
FIG. 5 shows the units of the switching center which are essential for call forwarding according to the invention.

FIG. 5 shows a block diagram of a switching center with the essential parts for call forwarding according to the invention. The example in FIG. 5 uses the call forwarding counter CFC in controlling call forwarding. CF handling unit 31 receives the parameters relating to call forwarding and compares the received CFC to the maximum value retrieved from max_CF storage 33 according to prior art. The forwarded-to number to be used in call forwarding is retrieved from the HLR via the HLR request unit 35 and/or from the VLR 37 according to prior art. According to the invention the switching center includes the extra_CF control unit 52 and the extra_CF storage 54, which contains the preset condition for call forwarding according to the invention. Alternatively, extra_CF storage 54 can contain more than one preset condition to be used as a combination to form one condition for the call forwarding allowance. According to the invention extra CF control unit 52 compares the number to be used in forwarding the call with the preset condition retrieved from extra_CF storage 54. Call forwarding is allowed according to the invention when the preset condition is met.

Figure 6:
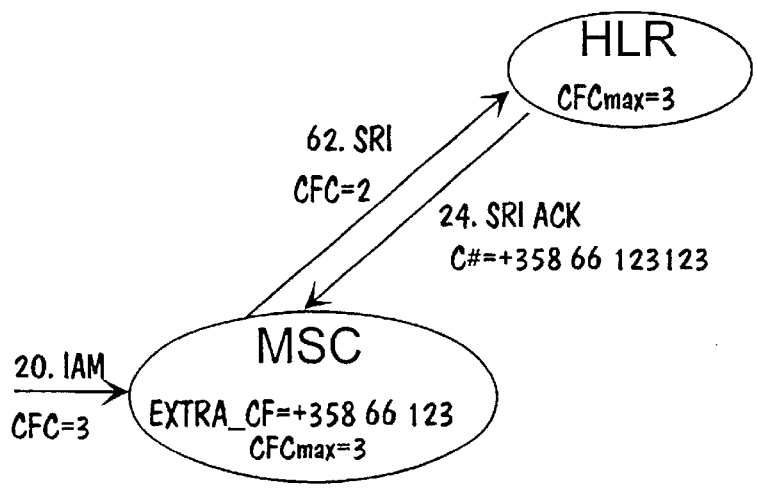
FIG. 6 shows the routing signaling according to the invention.

FIG. 6 shows an example situation for call forwarding according to the invention. In the example, the call forwarding allowance examination according to prior art is carried out both in the MSC and in the HLR, the maximum number of times for call forwarding is 3, and the condition for call forwarding according to the invention is that the forwarded-to number to be used for call forwarding begins with +358 66 123. The call is transferred to the MSC in IAM-message 20. In this message the CFC value of 3 is also transferred. The switching center MSC compares the CFC to the maximum value and detects that no further call forwarding is allowed according to prior art. In order to be able to get a forwarded-to number from the HLR, the MSC cheats the HLR by decreasing the CFC value by one. The MSC sends this decreased value to the HLR in SRI-message 62. As the HLR detects that the CFC is below the maximum value, it sends the MSC the forwarded-to number +358 66 123123 in SRI ACK-message 24. The switching center MSC compares this number with the preset condition for call forwarding according to the invention. As this number fulfills the preset condition, MSC forwards the call to the number. If the preset condition is not fulfilled, call forwarding is denied.

When using information about previous call forwarding in controlling call forwarding, the method described above can be utilized by first setting the call forwarding counter CFC to the maximum value, for example, and then performing the steps described above.

When forwarding the call after fulfilling the condition according to the invention, it is advantageous to handle the different parameters relating to the call in the following manner: 1) not to increase the call forwarding counter CFC to a value greater than the maximum value for call forwarding, 2) not to modify the original called number, 3) not to replace the original redirection reasons, 4) to replace the latest redirecting number, so as to keep the charging of the call valid and possibly to inform the voice mail service as to whose voice mail the call is directed, and/or 5) to update the latest redirecting reason.

When applying the invention in a fixed network, the signaling between the switching center and the HLR is omitted, as the subscriber information is located within the switching center.

The invention is especially advantageous when call forwarding is restricted according to prior art to only one call forwarding per call or to some other low value.

The drawings and the related description are only intended to demonstrate the principles of the invention. The details of the method according to the invention can vary within the patent claims. Although the invention was described above mostly in connection with GSM, the invention can also be used in other telecommunications networks, such as analog or digital mobile communications networks, e.g. UMTS, satellite communications networks, cordless telephone networks, e.g. DECT (Digital European Cordless Telephone), trunking networks, e.g. TETRA (Trans-European Trunked Radio), and fixed networks. The invention is also suitable for use in combined networks. The invention is not restricted for use only in connection with a call forwarding counter such as presented above, but can be applied in connection with some other call forwarding restriction parameter providing information about call forwarding or its combination with a call forwarding counter. Although the functionality of the invention is described above as located in proximity to the switching center, the arrangement according to the invention can also be located in some other part/parts of the network, such as the home location register. The invention is suitable for use in connection with different conditional and unconditional call forwarding, not only with the ones mentioned above. The invention is not restricted for use only in connection with voice call presented above, but can be applied also in connection with data transmission, such as fax transmission. The call forwarding restriction can take place also in other situations than those presented above, such as restriction to forward the call to international numbers.

What is claimed is:

1. A method of call forwarding in a telecommunications network, wherein a call is to be forwarded from one number to another number and call forwarding is restricted when a preset criterion for restriction is met, comprising:

whenever the restriction of call forwarding is in force, selectively overriding the restriction by allowing call forwarding to numbers which fulfill a predetermined condition;

wherein the number of times per call that call forwarding can be performed is restricted according to a preset maximum number, and in order to allow call forwarding the value indicating the number of times call forwarding has been performed is decreased to a value less than the preset maximum number and call forwarding is continued on the basis of this decreased value.

2. The method according to claim 1, wherein the predetermined condition includes the value of at least one digit of the number to be used for call forwarding and call forwarding is allowed to a number having digits which coincide with the predetermined condition.

3. The method according to claim 1, wherein the original value indicating the number of times call forwarding has been performed is transferred with the forwarded call.

4. The method according to claim 1, wherein the predetermined condition is stored in the telecommunications network associated with the unit controlling call forwarding.

5. The method according to claim 1, wherein the predetermined condition is set by an operator.

6. An arrangement for call forwarding in a telecommunications network including a register (HLR, VLR) holding subscriber information including a number to be used for call forwarding for the subscriber, means of forwarding a call from one number to another, and means of restricting call forwarding, wherein the arrangement comprising:

means for overriding restriction of call forwarding, said means being adapted to allow call forwarding to numbers which fulfill a predetermined condition whenever call forwarding is restricted according to a preset maximum number, when the number of times call forwarding has been performed is below the preset maximum number, means for allowing call forwarding include:

a storage unit for storing the predetermined condition; and a control unit for providing for the register a decreased value of the number of times call forwarding has been performed that is less than the preset maximum number and comparing the number to be used for call forwarding with the predetermined condition.

7. The arrangement according to claim 6, wherein means for overriding restriction of call forwarding is located in proximity to a switching center(MSC).

8. The arrangement according to claim 6, wherein means for overriding restriction of call forwarding it is located in proximity to a subscriber information register (HLR).

9. The arrangement according to claim 6, wherein means for overriding restriction of call forwarding is located in proximity to a switching center (MSC) and a subscriber information register (HLR).

* * * * *